United States Patent
Ho et al.

(10) Patent No.: US 11,174,031 B2
(45) Date of Patent: Nov. 16, 2021

(54) ENVIRONMENTAL CONTROL SYSTEM OF AN AIRCRAFT

(71) Applicant: Hamilton Sundstrand Corporation, Charlotte, NC (US)

(72) Inventors: Tony Ho, Glastonbury, CT (US); Louis J. Bruno, Ellington, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 219 days.

(21) Appl. No.: 16/459,152

(22) Filed: Jul. 1, 2019

(65) Prior Publication Data

US 2021/0001992 A1   Jan. 7, 2021

(51) Int. Cl.
| | |
|---|---|
| B64D 13/06 | (2006.01) |
| F25B 9/00 | (2006.01) |
| F25B 9/06 | (2006.01) |

(52) U.S. Cl.
CPC .............. *B64D 13/06* (2013.01); *F25B 9/004* (2013.01); *F25B 9/06* (2013.01); *B64D 2013/0618* (2013.01)

(58) Field of Classification Search
CPC . B64D 13/06; B64D 2013/0618; F25B 9/004; F25B 9/06
See application file for complete search history.

(56) References Cited

U.S. PATENT DOCUMENTS

| | | |
|---|---|---|
| 5,461,882 A | 10/1995 | Zywiak |
| 9,669,936 B1 | 6/2017 | Fiterman et al. |
| 2015/0307196 A1 | 10/2015 | Bruno |
| 2016/0229541 A1 | 8/2016 | Bruno et al. |
| 2017/0341759 A1* | 11/2017 | Bruno ............... B64D 13/02 |
| 2018/0215474 A1 | 8/2018 | Defrancesco et al. |
| 2019/0002109 A1 | 1/2019 | Bruno et al. |
| 2019/0135441 A1 | 5/2019 | Bruno et al. |

FOREIGN PATENT DOCUMENTS

| | | |
|---|---|---|
| EP | 3249196 A1 | 11/2017 |
| EP | 3354574 A1 | 8/2018 |
| EP | 3587269 A1 | 1/2020 |

OTHER PUBLICATIONS

Extended European Search Report; International Application No. 19212423.8-1010; International Filing Date: Nov. 29, 2019; dated Jul. 15, 2020; 13 pages.

* cited by examiner

*Primary Examiner* — Ana M Vazquez
(74) *Attorney, Agent, or Firm* — Cantor Colburn LLP

(57) ABSTRACT

An environmental control system for providing a conditioned medium to one or more loads of an aircraft includes a compressing device including a compressor and a turbine operably coupled to the compressor. The turbine is arranged downstream from the compressor relative to a flow of first medium. At least one power turbine is operably coupled to the compressor. The at least one power turbine is configured to receive a flow of a second medium, and the flow of second medium includes a cabin discharge air.

19 Claims, 7 Drawing Sheets

ENVIRONMENTAL CONTROL SYSTEM OF AN AIRCRAFT

BACKGROUND

Embodiments of the disclosure relate to environmental control systems, and more specifically to an environmental control system of an aircraft.

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin.

Early air conditioning systems commonly used on an aircraft, were typically driven by pressurized air supplied from a turbo compressor. High pressure air drawn from an engine is delivered to a turbo compressor to compress outside air within the turbo compressor. The compressed outside air output from turbo compressor then passes through a series of heat exchangers, an air cycle machine, and a high pressure water separator where the air is cooled and dehumidified. The resulting cool dry air is provided to the cabin, flight deck, and one or more other systems of the aircraft.

BRIEF DESCRIPTION

According to one embodiment, an environmental control system for providing a conditioned medium to one or more loads of an aircraft includes a compressing device including a compressor and a turbine operably coupled to the compressor. The turbine is arranged downstream from the compressor relative to a flow of first medium. At least one power turbine is operably coupled to the compressor. The at least one power turbine is configured to receive a flow of a second medium, and the flow of second medium includes a cabin discharge air.

In addition to one or more of the features described above, or as an alternative, in further embodiments only the first medium is provided to the one or more loads of the aircraft.

In addition to one or more of the features described above, or as an alternative, in further embodiments the first medium is fresh outside air.

In addition to one or more of the features described above, or as an alternative, in further embodiments the at least one power turbine is configured to receive a flow of a third medium.

In addition to one or more of the features described above, or as an alternative, in further embodiments the at least one power turbine includes a single power turbine configured to receive the flow of second medium and the flow of the third medium.

In addition to one or more of the features described above, or as an alternative, in further embodiments the single power turbine includes a first inlet and a second inlet, the flow of second medium being provided to the first inlet and the flow of third medium being provided to the second inlet.

In addition to one or more of the features described above, or as an alternative, in further embodiments the at least one power turbine includes a first power turbine configured to receive the flow of second medium and a second power turbine configured to receive the flow of the third medium.

In addition to one or more of the features described above, or as an alternative, in further embodiments the flow of third medium is provided from a bleed air source including at least one of an engine and an auxiliary power unit of the aircraft.

In addition to one or more of the features described above, or as an alternative, in further embodiments comprising a ram air circuit including a ram air duct having at least one heat exchanger positioned therein.

In addition to one or more of the features described above, or as an alternative, in further embodiments the power turbine is operable to receive the flow of second medium from an outflow heat exchanger.

In addition to one or more of the features described above, or as an alternative, in further embodiments the environmental control system is operable in a plurality of modes including a first mode and a second mode.

In addition to one or more of the features described above, or as an alternative, in further embodiments the environmental control system is operable in the first mode when the aircraft is in a ground and/or low altitude flight condition.

In addition to one or more of the features described above, or as an alternative, in further embodiments the environmental control system is operable in the second mode when the aircraft is in a high altitude flight condition.

In addition to one or more of the features described above, or as an alternative, in further embodiments comprising a valve operable to control a supply of the second medium to the environmental control system.

In addition to one or more of the features described above, or as an alternative, in further embodiments the valve is open when the environmental control system is operating in the second mode and the valve is closed when the environmental control system is operating in the first mode.

In addition to one or more of the features described above, or as an alternative, in further embodiments the environmental control system further comprises a bypass valve arranged upstream from the turbine relative to the flow of the first medium.

According to another embodiment, an environmental control system for providing a conditioned medium to one or more loads of an aircraft includes a compressing device including a compressor and a turbine operably coupled to the compressor. The turbine is arranged downstream from the compressor relative to a flow of first medium. At least one power turbine is operably coupled to the compressor. The at least one power turbine is configured to receive a flow of a second medium and a flow of a third medium simultaneously. At least one of the flow of second medium and the flow of third medium includes cabin discharge air.

According to yet another embodiment, a method of operating an environmental control system of an aircraft includes providing a first medium to the environmental control system including a compressor, a turbine, and at least one power turbine wherein the first medium is provided to the compressor and the turbine sequentially and extracting work from at least one of a second medium and a third medium provided to the at least one power turbine to drive the compressor. In a mode of operation, work is extracted from the second medium and the third medium by the power turbine simultaneously and one of the second medium and the third medium is cabin discharge air.

In addition to one or more of the features described above, or as an alternative, in further embodiments comprising providing a conditioned medium to one or more loads of the aircraft, wherein the conditioned medium includes only the first medium.

In addition to one or more of the features described above, or as an alternative, in further embodiments in another mode of operation, work is extracted from only the second medium by the power turbine.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

Figure 1:
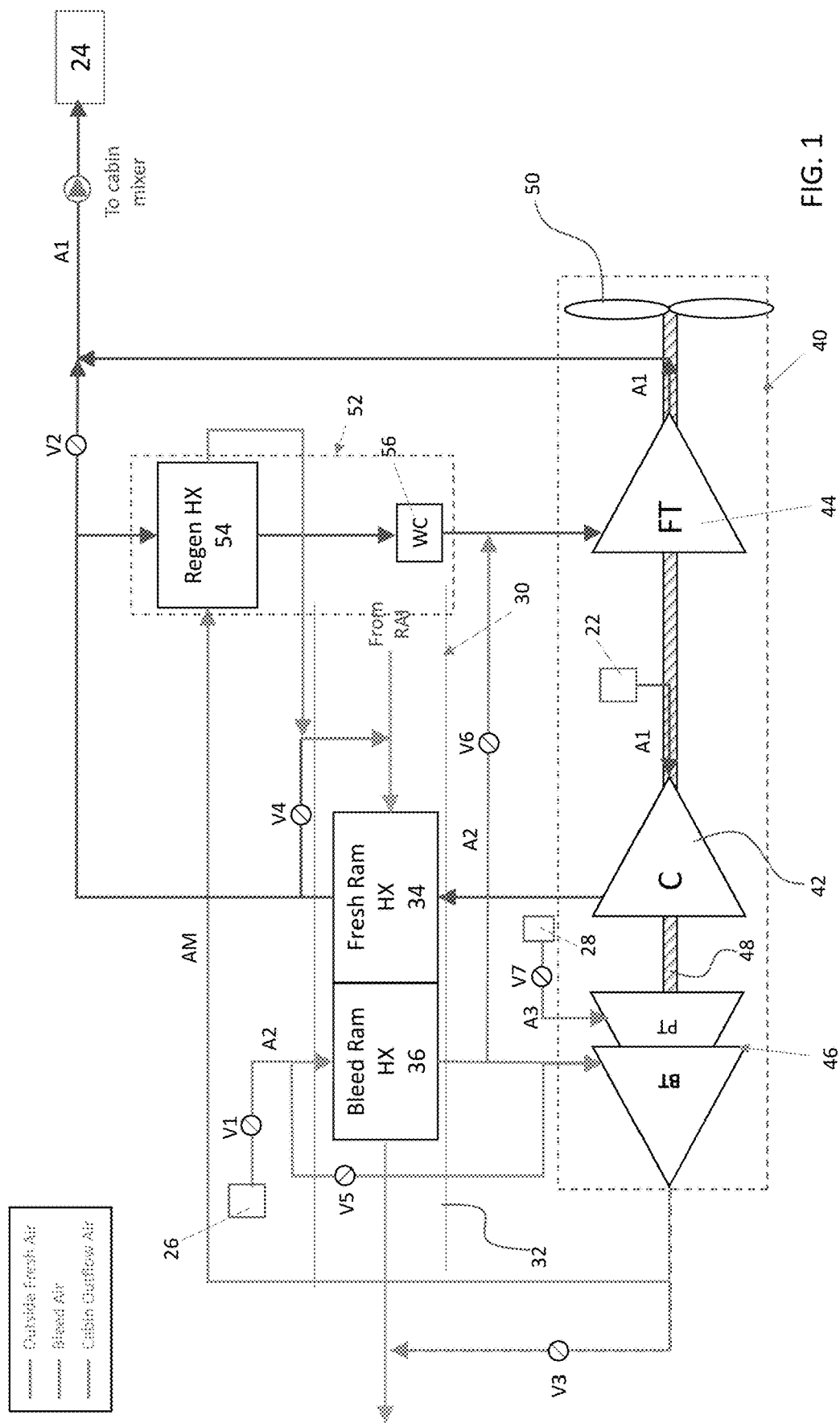
FIG. 1 is a schematic diagram of an environmental control system according to an embodiment.

A detailed description of one or more embodiments of the disclosed apparatus and method are presented herein by way of exemplification and not limitation with reference to the FIGS.

Embodiments herein provide an environmental control system of an aircraft that receives multiple mediums from different sources and uses energy from one or more of the mediums to operate the environmental control system and to provide cabin pressurization and cooling at a high fuel burn efficiency. The mediums described herein are generally types of air; however, it should be understood that other mediums, such as gases, liquids, fluidized solids, or slurries are also contemplated herein.

With reference now to the FIGS., schematic diagrams of a portion of an environment control system (ECS) 20 are depicted according to various embodiments. Although the environmental control system 20 is described herein with reference to an aircraft, alternative applications are also within the scope of the disclosure. The system 20 is configured to receive one or more mediums and provide a conditioned medium to one or more loads of the aircraft. As shown in the FIGS., the system 20 can receive a first medium A1 at a first inlet 22 and provide a conditioned form of the first medium A1 to a volume 24. In embodiments where the environmental control system 20 is used in an aircraft application, the first medium A1 is fresh or outside ambient air. The outside air may be procured via one or more scooping mechanisms, such as an impact scoop or a flush scoop and may or may not be part of the ram inlet. Thus the first inlet 22 can be considered a fresh air inlet or an outside air inlet. Generally, the fresh air described herein is at an ambient pressure outside of the aircraft with respect to altitude.

The system 20 is also configured to receive a second medium A2 at a second inlet 26. The second medium A2 is a pressurized fluid. In one embodiment, the second medium A2 is bleed air. As used herein, the term "bleed air" includes pressurized air originating from i.e. being "bled" from, an engine or auxiliary power unit of the aircraft. It shall be understood that one or more of the temperature, humidity, and pressure of the bleed air may vary based upon the compressor stage and revolutions per minute of the engine or auxiliary power unit from which the air is drawn. For example, bleed air may be drawn from either a low pressure compressor spool or a high pressure compressor spool of an engine, and bleed air drawn from the low pressure compressor spool will have a relatively lower pressure than bleed air drawn from the high pressure compressor spool. In some embodiments, the system 20 is configured to extract work from the second medium A2. In this manner, the pressurized air A2 can be utilized by the system 20 to achieve certain operations.

In some embodiments, the system 20 is further configured to receive a third medium A3 at a third inlet 28. The third medium A3 is also a pressurized medium, such as cabin discharge air leaving the volume 24, and which would typically be exhausted or dumped overboard. In some embodiments, the system 20 is configured to extract work from the third medium A3. In this manner, the third medium A3 can be utilized by the system 20 in place of, or in addition to the second medium A2, to achieve certain operations at different altitudes.

The environmental control system 20 includes one or more heat exchangers. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers. In an embodiment, the one or more heat exchangers may be located within the ram air duct 32 of a RAM air circuit 30, such that the one or more heat exchangers may be referred to as "ram heat exchangers." Within the one or more heat exchangers, a cooling fluid, such as outside air, also referred to herein as "RAM air" drawn in through a scoop for example, acts as a heat sink to cool a medium passing there through, for example the first medium A1 and/or the second medium A2. In an embodiment, the one or more heat exchangers includes a first heat exchanger 34 and a second heat exchanger 36. The first and second heat exchangers 34, 36 may be arranged in series relative to the flow of cooling medium. Although a first and second heat exchanger 34, 36 are illustrated and described herein, it should be understood that embodiments including only a single heat exchanger, or alternatively, embodiments including more than two heat exchangers are also within the scope of the disclosure.

The system 20 additionally comprises at least one compressing device 40. In the illustrated, non-limiting embodiment, the compressing device 40 of the system 20 is a mechanical device that includes components for performing thermodynamic work on a medium (e.g., extracts work from or applies work to the first medium A1 and/or the second medium A2 by raising and/or lowering pressure and by raising and/or lowering temperature.) Examples of the compressing device 40 include an air cycle machine, a three-wheel air cycle machine, a four-wheel air cycle machine, etc. . . . .

As shown, the compressing device 40 includes a compressor 42, a turbine 44, and a power turbine 46, operably coupled to each other via a shaft 48. Although a fan 50 is shown connected to the shaft 48, embodiments where the fan is located remotely from the shaft are also contemplated herein. The compressor 42 is a mechanical device that raises a pressure of a medium provided thereto and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2.

Figure 5:
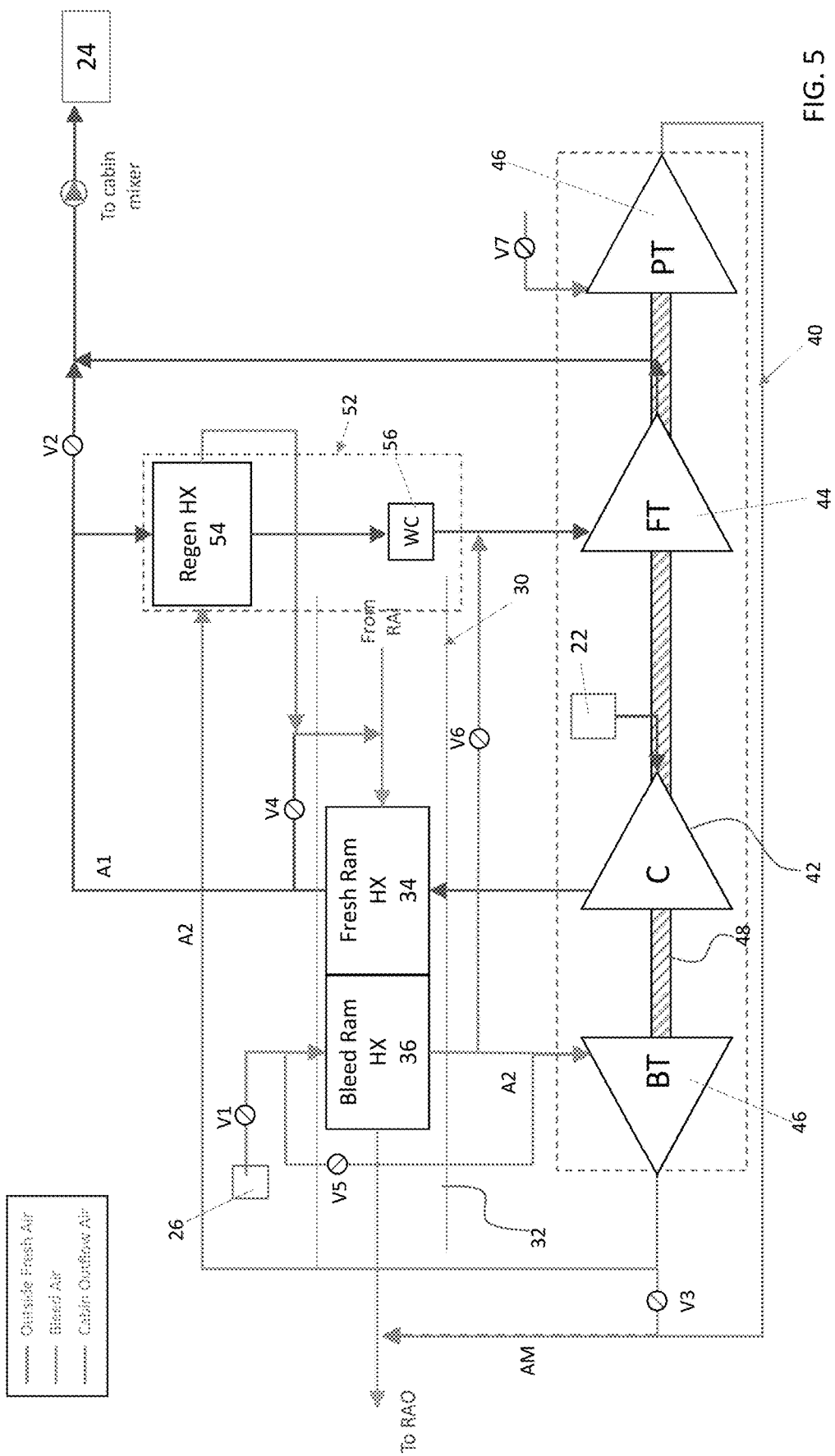
FIG. 5 is a schematic diagram of an environmental control system according to another embodiment.
Figure 6:
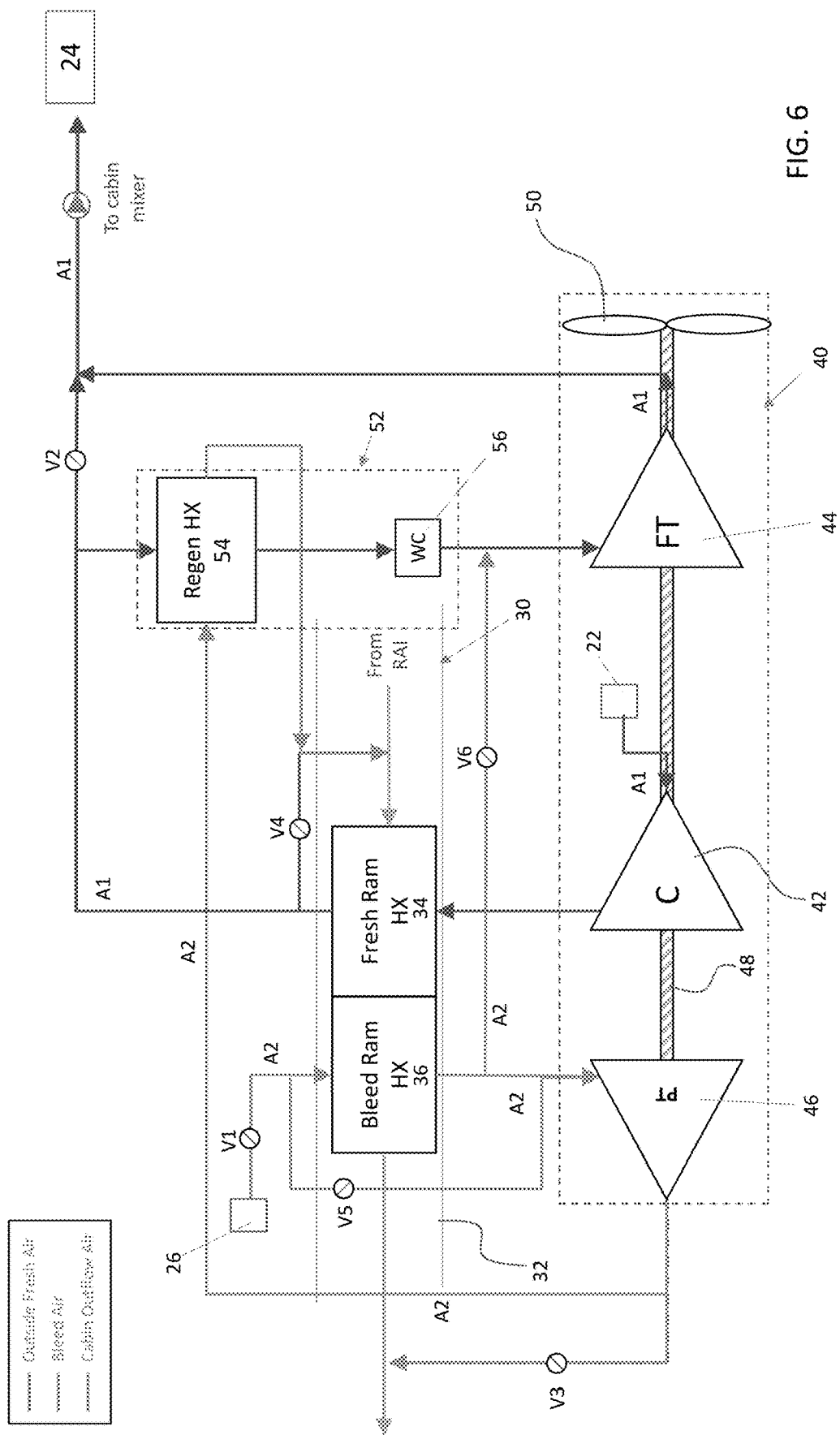
FIG. 6 is a schematic diagram of an environmental control system according to an embodiment.

The turbine 44 and the power turbine 46 are mechanical devices that expands a medium and extracts work therefrom (also referred to as extracting energy). In the illustrated, non-limiting compressing device 40, the turbine 44 and the power turbine 46 drive the compressor 42 and the fan 50 via the shaft 48. In an embodiment, best shown in FIGS. 1-4, the power turbine 46 is a dual entry turbine that includes multiple inlet fluid flow paths, such as an inner flow path and an outer flow path. In an embodiment, the inner flow path is a first diameter and the outer flow path is a second diameter. Further, the power turbine 46 may include a first nozzle configured to accelerate a first medium for entry into a turbine impeller and a second nozzle configured to accelerate a second medium for entry into the turbine impeller. However, embodiments where the compressing device 40 includes multiple power turbines 46, each of which is configured to receive a single fluid flow as shown in FIG. 5, and embodiments where the compressing device 40 includes a single power turbine 46 configured to receive a single pressurized fluid flow, as shown in FIG. 6 for example, are also within the scope of the disclosure.

The fan 50 is a mechanical device that can force, via push or pull methods, a medium (e.g., ram air) across the one or more heat exchangers and at a variable cooling to control temperatures.

The system 20 additionally includes a dehumidification system 52. In the illustrated, non-limiting embodiment of FIG. 1, the dehumidification system 52 is arranged downstream from the first heat exchanger 34 relative to a flow of first medium and includes a regeneration heat exchanger 54 and a water collector 56 arranged in series. The water collector 56 is a mechanical device operable to remove water from a medium. In another embodiment, best shown in FIG. 7, the dehumidification system additionally includes a first regeneration heat exchanger Ma, for example associated with the flow of first medium A1, and a second regeneration heat exchanger 54b associated with the flow of second medium A2. As shown, the second regeneration heat exchanger 54b may be arranged downstream from the first regeneration heat exchanger Ma with respect to a cooling flow. However, embodiments where the first regeneration heat exchanger Ma and the second regeneration heat exchanger 54b are not arranged in series relative to a cooling flow are also within the scope of the disclosure. It should be understood that the disclosed configuration of the dehumidification system is intended as an example only, and embodiments including one or more additional components are also within the scope of the disclosure.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system can be regulated to a desired value. For instance, a first valve V1 is configured to control a supply of the second medium A2 provided to the system 20.

A second valve V2 may be operable to allow a portion of a medium, such as the first medium A1, to bypass the turbine 44 of the compressing device 40. As a result, operation of the second valve V2 may be used to add heat and reduce back pressure on the compressor 42. A third valve V3 may be located downstream from an outlet of the power turbine 46 to selectively control flow of the medium output from the power turbine 46 provided directly to the ram air circuit or to be exhausted overboard. In an embodiment, a fourth valve V4 is arranged downstream from the first heat exchanger and is operable to the surge margin of the compressor 42. A fifth valve V5 may be operable to allow a portion of a medium, such as the second medium A2, to bypass the ram air circuit 30 and a sixth valve may be operable to selectively couple the flow of a pressurized medium, such as the second medium A2 or the third medium A3, to the turbine 44. In embodiments where the power turbine 46 is a dual entry turbine, a seventh valve V7 is operable to control a supply of the third medium A3 provided to the system 20, and more specifically to the power turbine 46.

The environmental control system 20 may be operable in a plurality of modes based on a flight condition of the aircraft. In an embodiment, a first mode of operation of the environmental control system 20 can be used when the aircraft is in a ground and/or low altitude flight condition (such as ground idle, taxi, take-off, and hold conditions for example). In the first mode of operation, best shown in FIG. 2, the valve V1 is open; however, valves V2-V7 are typically closed. More specifically, in embodiments where the system 20 is operable to receive a flow of pressurized third medium (FIGS. 1-5, and 7), such as cabin outflow air, to operate the compressor 42, the valve V7 is closed, and the third medium A3 is not provided to the environmental control system 20.

Figure 2:
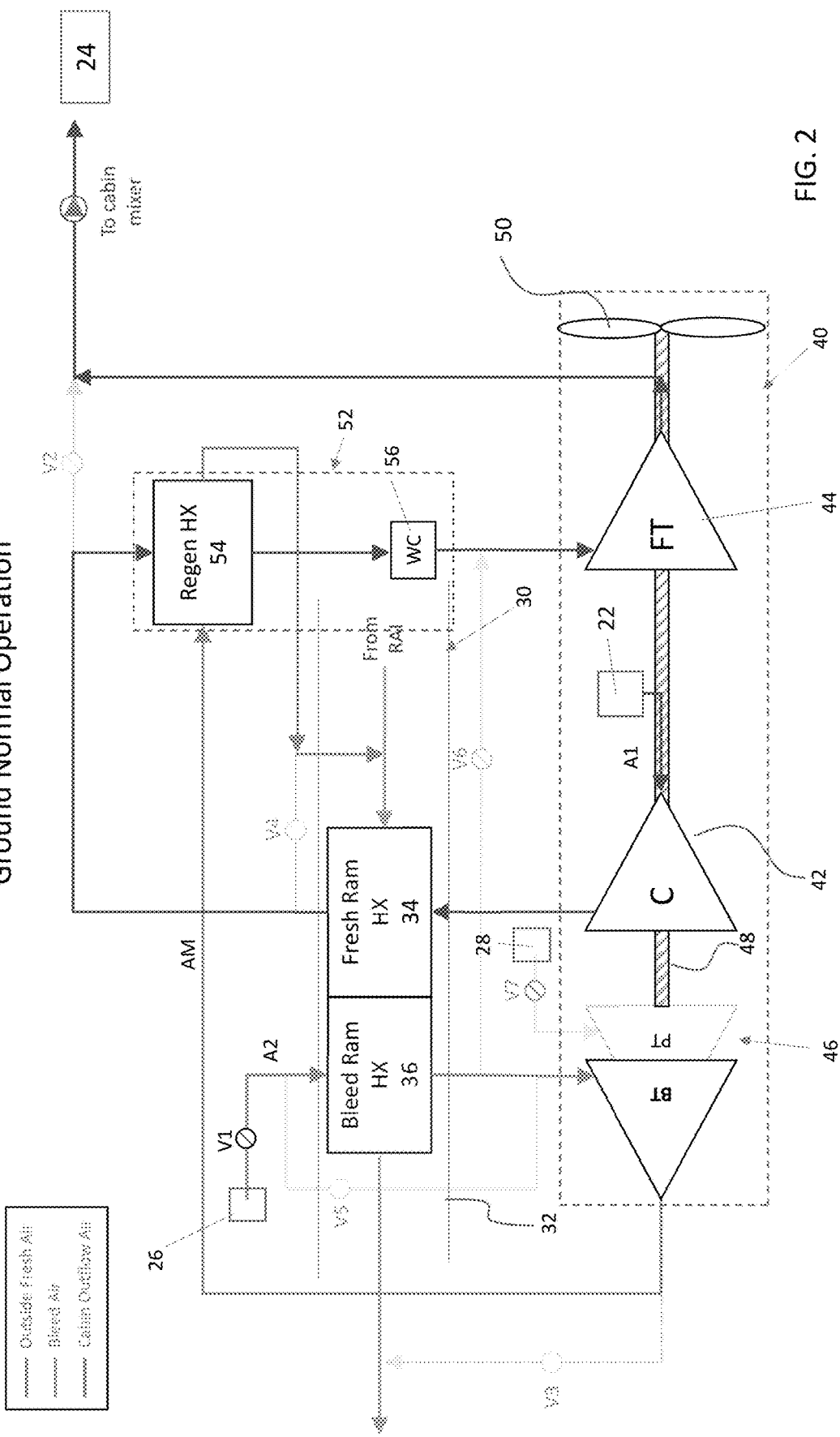
FIG. 2 is a schematic diagram of the environmental control system of FIG. 1 during operation in a first mode according to an embodiment.

As shown in FIG. 2, a flow of high pressure, hot second medium A2 passes through the second ram air heat exchanger 36 where the second medium A2 is cooled by a flow of ram air. The second medium A2 then enters the power turbine 46, and the high pressure, high temperature second medium A2 is expanded across the power turbine 46 and work is extracted therefrom. This extracted work drives the compressor 42 via shaft 48. Because only a single flow of second medium A2 is provided to the power turbine 46 during operation of the system 20 in the first mode, the cooled flow of second medium A2 output from the power turbine 46 forms a cooling flow that is provided to the at least one regeneration heat exchanger 54. From the at least one regeneration heat exchanger 54, the second medium A2 may be exhausted overboard, or alternatively, into the ram air circuit 30, such as at a location downstream from the ram air heat exchangers 34, 36.

At the same time, a flow of low pressure first medium A1 is provided to an inlet of the compressor 42, where the air is compressed and heated. As shown in FIGS. 1-4, the compressed first medium A1 output from the compressor 42 is provided to the first heat exchanger 34 where the compressed first medium A1 is cooled via a flow of ram air. From the first heat exchanger 34, the warm first medium A1 is provided to at least a portion of the dehumidification system 52. For example, the first medium A1 passes through the regeneration heat exchanger 54 and the water collector 56 sequentially to remove free moisture within the first medium A1. The resulting cool, high pressure first medium A1 then enters the turbine 44 and work is extracted therefrom. This work, in combination with the work extracted at the power turbine 46, drives the compressor 42 and the fan 50. The cool first medium A1 output from the turbine 44 is then sent to one or more downstream loads and/or locations of the aircraft. In an embodiment, the first medium A1 output from the turbine 44 is used to condition the volume 24, such as the cabin and flight deck of an aircraft via the cabin mixer, for example.

Figure 3:
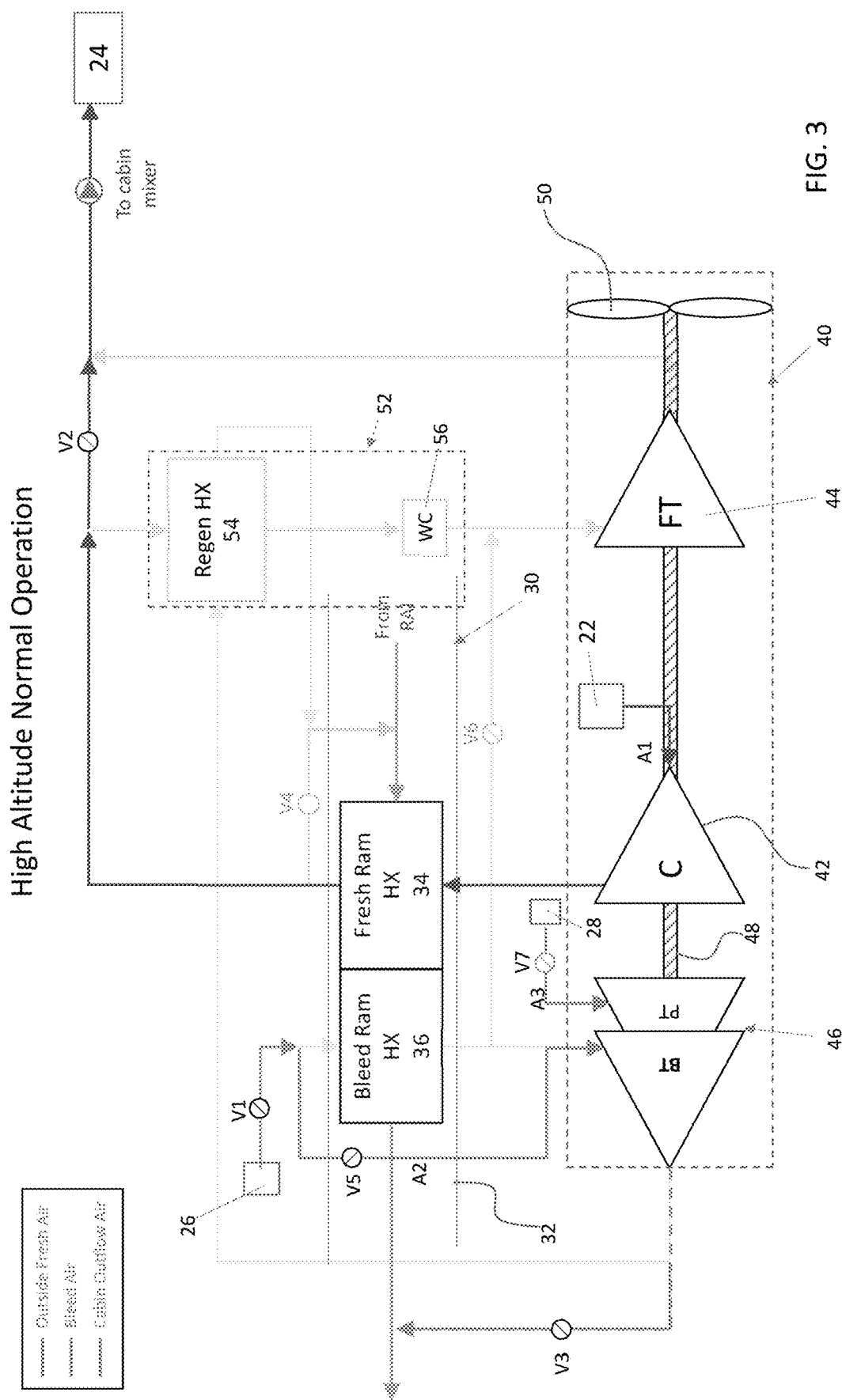
FIG. 3 is a schematic diagram of the environmental control system of FIG. 1 during operation in a second mode according to an embodiment.

A second mode of operation of the environmental control system 20 may be used when the aircraft is in a high altitude flight condition, such as high altitude cruise, climb, and descent. With reference to FIG. 3, in the second mode of operation, the first valve V1 is opened to draw a high pressure, hot second medium A2, such as bleed air, from a bleed air source, such as the turbine engine or the auxiliary power unit. The second medium A2 may be provided to a second heat exchanger 36 where the second medium A2 is further cooled by a flow of ram air. Alternatively, as shown in the FIG. 3, valve V5 may be opened such that during the second mode of operation, the second medium A2 bypasses the second heat exchanger 36 and is provided directly to the power turbine 46. Further, in embodiments of the system 20 that include a second regeneration heat exchanger 54b (FIG. 7), this second medium A2 may be configured to pass through the second regeneration heat exchanger 54b, where the second medium A2 is cooled at least partially by a cooling flow, prior to passing through the second heat exchanger 36 or diverting around the second heat exchanger 36.

In embodiments where system 20 is operable to receive a pressurized third medium, such as cabin discharge air, in the second mode of operation, valve V7 is open. Accordingly, a flow of both the second medium A2 and the third medium A3 are provided to one or more power turbines 46 of the compressing device 40. In the second mode of operation, valve V3 is open such that the one or more pressurized mediums A2 and or A3 output from the at least one power turbine 46 are exhausted overboard, or into the ram air circuit 30. Within a power turbine 46, the high pressure, high temperature second medium A2, is expanded and work is extracted therefrom. This extracted work drives the compressor 42 via shaft 48. This extracted work may also drive the fan 50, which is used to move air through the first and second heat exchangers 34, 36, via the ram air duct 32.

At the same time, a flow of cool, low pressure first medium A1, such as fresh outside air for example, is provided to the system 20. The first medium A1 is provided to an inlet of the compressor 42. The act of compressing the fresh outside air, heats the fresh outside air. In an embodiment, best shown in FIG. 7, the system 20 may include an outflow heat exchanger 60 arranged upstream from the first heat exchanger 34 relative to the flow of first medium A1 and upstream from the power turbine 46 relative to the flow of third medium A3. Within the outflow heat exchanger 60, the flow of third medium A3 is configured to cool the first medium A1. The resulting warm third medium A3 is then provided to a power turbine 46, such as via a second nozzle for example. The medium pressure, warm third medium A3 is expanded across the power turbine 46 and work is extracted from the warm air. This extracted work drives the compressor 42 via shaft 48 and further drives the fan 50, which is used to move air through the first and second heat exchangers 34, 36, via a ram air duct 32 as previously described. In such embodiments, the second medium A2 and the third medium A3 may be mixed at the outlet of the power turbine 46 to produce a mixed flow Am, which may be used as the cooling flow within the dehumidification system 52 and/or which may be exhausted overboard or dumped into the ram air circuit 30 during operation of the system 20.

Figure 7:
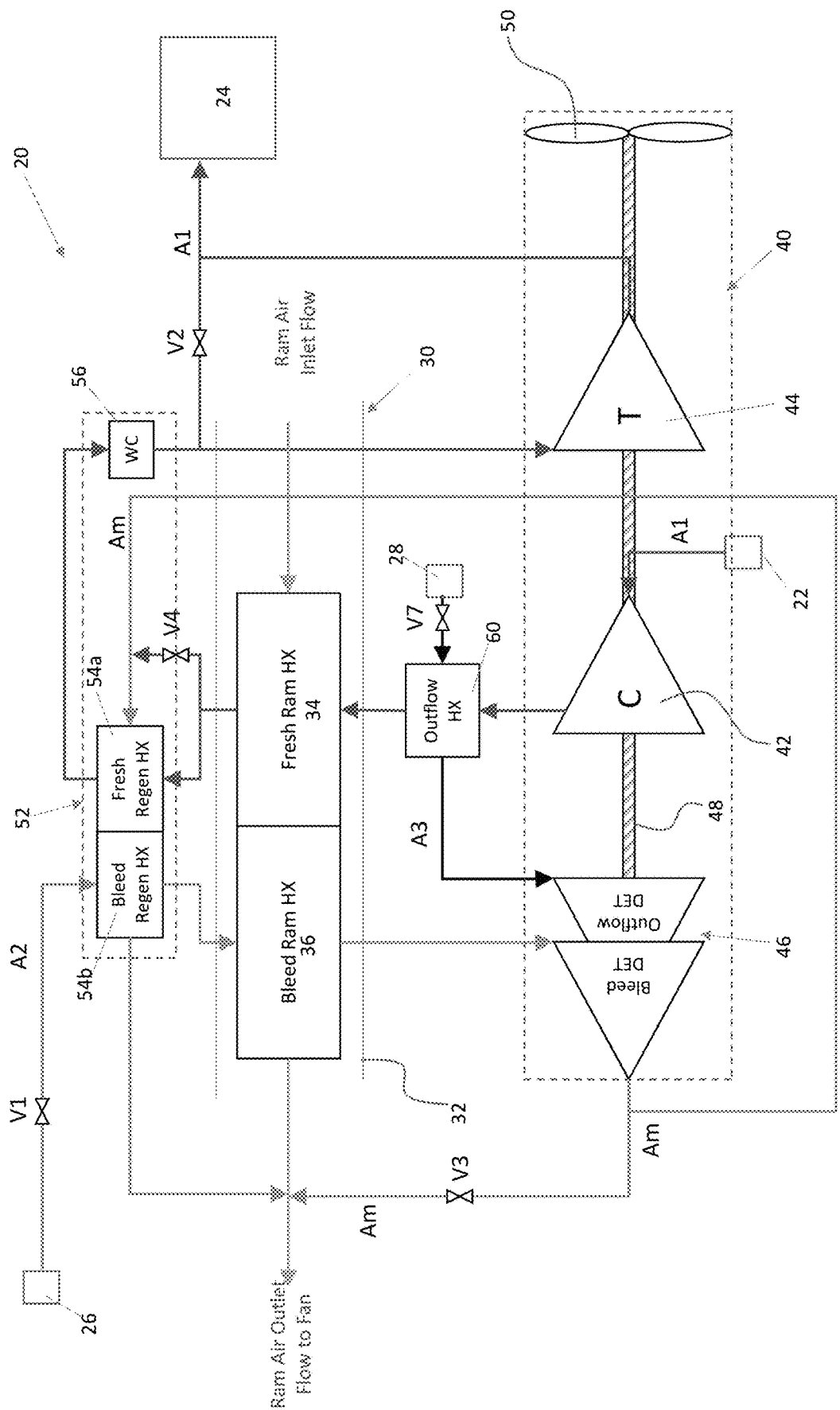
FIG. 7 is a schematic diagram of yet another environmental control system according to an embodiment.

In the second mode of operation, valve V2 is open such that the flow of the first medium A1 is configured to bypass the turbine 44. By allowing a portion of the first medium A1 to bypass the turbine 44, the temperature of the air provided to the volume 24 or other loads is increased, while reducing the pressure drop of the first medium A1. For example, as shown in FIG. 7, at least a portion of the first medium A1 output from the first heat exchanger 34 is provided sequentially to the first regeneration heat exchanger 54a and to the water collector 56 of the dehumidification system 52. Since the flow of one or more pressurized mediums output from the at least one power turbine 46 is exhausted overboard or into the ram air circuit 30 via open valve V3, no cooling flow is provided to the at least one regeneration heat exchanger 54. Accordingly, although the flow of first medium A1 passes through the first regeneration heat exchanger 54a, no heat transfer occurs therein. After any condensed moisture is removed from the flow of first medium A1 within the water collector 56, the first medium A1 is delivered to the one or more downstream loads and/or locations of the aircraft, such as the cabin mixer arranged in fluid communication with the volume or cabin 24 for example.

In some embodiments, when valve V2 is open, the warm first medium A1 output from the first heat exchanger 34 is provided directly to the one or more downstream loads and/or locations of the aircraft. In such embodiments, the flow of the first medium A1 provided at an outlet of the first heat exchanger 34 is configured to bypass both the dehumidification system 52 and the turbine 44.

Figure 4:
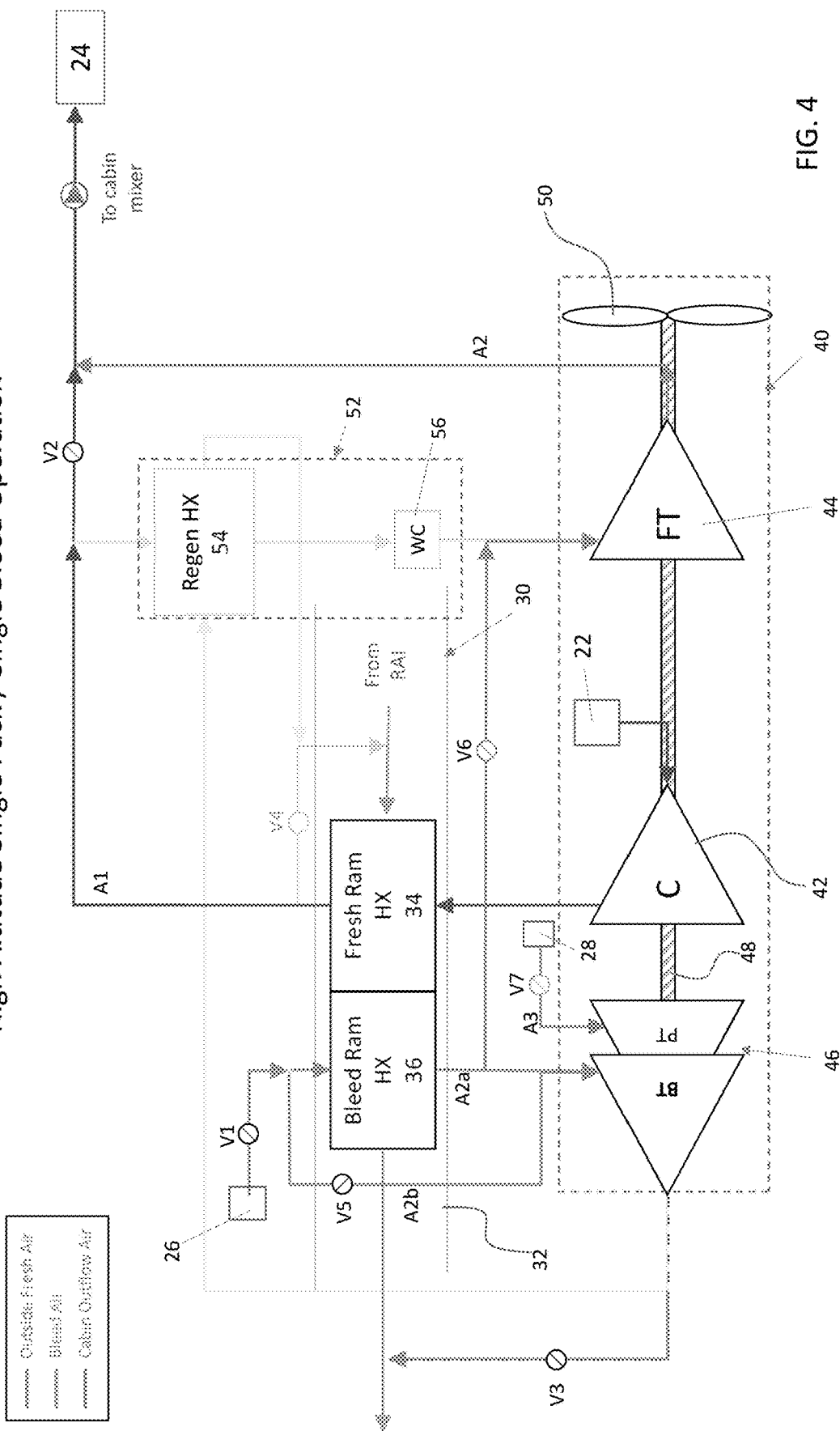
FIG. 4 is a schematic diagram of the environmental control system of FIG. 1 during operation in a third mode according to an embodiment.

With reference now to FIG. 4, a third mode of operation of the environmental control system 20 may be used when one of the plurality of ECS packs of the control system 20 experiences a failure and/or is non-operational when the aircraft is in a high altitude flight condition. The third mode of operation is substantially similar to the second mode of operation. However, in the third mode of operation, valve V6 is additionally open, thereby allowing a portion of the second medium A2 to be diverted to the turbine 44. In such embodiments, work may be extracted from the second medium A2 provided to the turbine 44, and the second medium A2 is then mixed with the first medium A1 upstream from the one or more loads.

As best shown in FIG. 4, during operation in the third mode of operation, a portion A2a of the second medium A2 is cooled within the second heat exchanger 36 of the ram air circuit 30, and a portion A2b of the second medium A2 bypasses the second heat exchanger 36. However, embodiments where all of the second medium A2 is provided to the second heat exchanger 36 or where all of the second medium A2 bypasses the second heat exchanger 36 are also contemplated herein. In the illustrated, non-limiting embodiment, the portion of the second medium A2b that bypasses the second heat exchanger 36 is provided to the power turbine 46 and a portion of the second medium A2a output from the second heat exchanger 36 is provided to the turbine 44, while another portion of the second medium A2 second medium A2a output from the second heat exchanger 36 is provided to the power turbine 46.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An environmental control system for providing a conditioned medium to one or more loads of an aircraft comprising:
    a compressing device including:
        a compressor;
        a turbine operably coupled to the compressor, the turbine being arranged downstream from the compressor relative to a flow of first medium; and
        at least one power turbine operably coupled to the compressor, wherein the at least one power turbine is configured to receive a flow of a second medium and is configured to receive a flow of a third medium, and the flow of second medium includes a cabin discharge air.

2. The environmental control system of claim 1, wherein only the first medium is provided to the one or more loads of the aircraft.

3. The environmental control system of claim 1, wherein the first medium is fresh outside air.

4. The environmental control system of claim 1, wherein the at least one power turbine includes a single power turbine configured to receive the flow of second medium and the flow of the third medium.

5. The environmental control system of claim 4, wherein the single power turbine includes a first inlet and a second inlet, the flow of second medium being provided to the first inlet and the flow of third medium being provided to the second inlet.

6. The environmental control system of claim 1, wherein the at least one power turbine includes a first power turbine configured to receive the flow of second medium and a second power turbine configured to receive the flow of the third medium.

7. The environmental control system of claim 1, wherein the flow of third medium is provided from a bleed air source including at least one of an engine and an auxiliary power unit of the aircraft.

8. The environmental control system of claim 1, further comprising a ram air circuit including a ram air duct having at least one heat exchanger positioned therein.

9. The environmental control system of claim 1, wherein the power turbine is operable to receive the flow of second medium from an outflow heat exchanger.

10. The environmental control system of claim 1, wherein the environmental control system is operable in a plurality of modes including a first mode and a second mode.

11. The environmental control system of claim 10, wherein the environmental control system is operable in the first mode when the aircraft is in a ground and/or low altitude flight condition.

12. The environmental control system of claim 10, wherein the environmental control system is operable in the second mode when the aircraft is in a high altitude flight condition.

13. The environmental control system of claim 10, further comprising a valve operable to control a supply of the second medium to the environmental control system.

14. The environmental control system of claim 13, wherein the valve is open when the environmental control system is operating in the second mode and the valve is closed when the environmental control system is operating in the first mode.

15. The environmental control system of claim 1, wherein the environmental control system further comprises a bypass valve arranged upstream from the turbine relative to the flow of the first medium.

16. An environmental control system for providing a conditioned medium to one or more loads of an aircraft comprising:
    a compressing device including:
        a compressor;
        a turbine operably coupled to the compressor, the turbine being arranged downstream from the compressor relative to a flow of first medium; and
        at least one power turbine operably coupled to the compressor, wherein the at least one power turbine is configured to receive a flow of a second medium and a flow of a third medium simultaneously, wherein at least one of the flow of second medium and the flow of third medium includes cabin discharge air.

17. A method of operating an environmental control system of an aircraft comprising:
    providing a first medium to the environmental control system including a compressor, a turbine, and at least one power turbine wherein the first medium is provided to the compressor and the turbine sequentially; and
    extracting work from at least one of a second medium and a third medium provided to the at least one power turbine to drive the compressor;
    wherein in a mode of operation, work is extracted from the second medium and the third medium by the power turbine simultaneously, and one of the second medium and the third medium is cabin discharge air.

18. The method of claim 17, further comprising providing a conditioned medium to one or more loads of the aircraft, wherein the conditioned medium includes only the first medium.

19. The method of claim 17, wherein in another mode of operation, work is extracted from only the second medium by the power turbine.

* * * * *